United States Patent [19]

Wu et al.

[11] Patent Number: 4,768,864
[45] Date of Patent: Sep. 6, 1988

[54] LIQUID-CRYSTAL-BASED OPTICAL POWER LIMITER

[75] Inventors: Shin-Tson Wu, Northridge; David M. Pepper, Malibu, both of Calif.

[73] Assignee: Hughes Aircraft Company, Los Angeles, Calif.

[21] Appl. No.: 820,848

[22] Filed: Jan. 21, 1986

[51] Int. Cl.[4] ............................................. G02F 1/133
[52] U.S. Cl. .................................... 350/351; 350/330
[58] Field of Search ............... 350/347 V, 347 E, 351, 350/330, 348, 353, 354, 393, 400

[56] References Cited

U.S. PATENT DOCUMENTS

| | | | |
|---|---|---|---|
| 3,831,028 | 8/1974 | Kerlman et al. | 350/393 |
| 3,851,318 | 11/1974 | Taylor et al. | 350/331 |
| 3,898,977 | 8/1975 | Draper | 350/351 |
| 3,915,553 | 10/1975 | Adams et al. | 350/352 |
| 3,954,653 | 5/1976 | Yamazaki | 350/337 |
| 4,042,302 | 8/1977 | Wentz | 356/364 |
| 4,262,198 | 4/1981 | Gupta et al. | 350/353 |
| 4,272,195 | 6/1981 | Kaye | 350/347 E |
| 4,394,069 | 7/1983 | Kaye | 350/347 E |
| 4,410,238 | 10/1983 | Hanson | 350/347 E |
| 4,410,239 | 10/1983 | Kaplan et al. | 350/354 |
| 4,585,301 | 4/1986 | Bialkowski | 350/354 |

FOREIGN PATENT DOCUMENTS

| | | | |
|---|---|---|---|
| 0157643 | 12/1979 | Japan | 350/347 V |
| 2146135 | 4/1985 | United Kingdom | 350/400 |

OTHER PUBLICATIONS

D. Maker et al "Intensity Dependent Changes in Refractive Index of Liquids", pp. 507-509-Physical Review Letters-vol. 12, No. 18-May 1964.
Azarov et al "Liquid Crystal Device for Optical Radiation", pp. 489-491-Inserum and Expo Tech (U.S.A.) vol. 24, No. 2, Oct. 1981.
Durbin et al-"Optical-Field-Induced . . . in a Nematic Liquid Crystal", pp. 1411-1414-Physical Review Letters-vol. 47, No. 19, 1981.
S. D. Durbin-"Optical-Field-Induced . . . Nematic Liquid Crystal", Nov. 9, 1981, pp. 1411-1414-The American Physical Society-vol. 47, No. 19, Nov. 1981.
A. D. Azarov-"Liquid Crystal Device for Optical Radiation Control", Inserum & Expo. Tech. (U.S.A.) pp. 489-491-vol. 24, No. 2-Apr. 1981.

Primary Examiner—John S. Heyman
Assistant Examiner—Tai Van Duong
Attorney, Agent, or Firm—Terje Gudmestad; V. D. Duraiswamy; A. W. Karambelas

[57] ABSTRACT

A broad-band optical light detector having a detector cell, a system for focusing light on the cell, and a liquid crystal positioned in the light path, the liquid crystal being prepared so that it passes light along the light path in the normal operating range of the detector cell and directs light away from the light path when a threshold intensity of light is reached.

1 Claim, 1 Drawing Sheet

LIQUID-CRYSTAL-BASED OPTICAL POWER LIMITER

BACKGROUND OF THE INVENTION

This invention relates to optical power limiters and, more particularly, to optical power limiters for detector circuits which may encompass a broad spectral bandwidth including infrared radiation.

Detector circuits are often used in situations in which an overload may occur causing the detector to be damaged and become unusable. For example, infrared detectors are often able to operate in ranges in which the amount of power to be detected is unknown. They are quite able to cope with power up to approximately $10^7$ watts/cm$^2$. However, if they encounter infrared signals over a threshold of approximately $10^8$ watts/cm$^2$ the detector unit may well be saturated with an undesirably long recovery time, damaged, or destroyed. It is not believed that the prior art has provided any convenient solution to this problem.

One of the difficulties with solving the power overload problem is that the time necessary for reaction to potential overloads must be very short in order to protect the detector circuitry; consequently, normal feedback circuitry operating off the response of the detector circuitry does not operate rapidly enough in some situations to accomplish a power reduction before damage has been done to the detector. Thus, the limiter, in order to react most rapidly should assess the power of the infrared beam directly. This form of sensitivity is unusual in power limiters.

Another difficulty in providing a power limiter for infrared detectors is that such detectors often must operate over quite broad bandwidths. Consequently, the power limiting arrangements must also operate over similar broad bandwidths.

It is, therefore, a purpose of this invention to provide a power limiter for protecting detectors over a broad bandwidth.

It is another purpose of this invention to increase the speed of operation of power limiters.

An additional purpose of this invention is to provide a broad-band power limiter for infrared detectors.

SUMMARY OF THE INVENTION

These and other objects of this invention are realized in a family of power limiters which utilize the properties of liquid crystals to provide rapid protection over broad bandwidths. A liquid crystal is placed in the optical path through which the signals to be detected are to proceed. The liquid crystal is arranged so that in its normal condition the signals are passed without any significant distortion or power reduction. However, when an overload signal is detected, the liquid crystal molecules are re-arranged or re-oriented so that the polarization state of the beam is changed and/or the beam is defocused or directed other than along the path to the detector cell. Since it is well known that liquid crystals may be made responsive over a very broad band, the invention provides for rapid protection from power overload for the detector cell over a very broad band.

Other objects and advantages of the invention will be better understood by reference to the specification taken in conjunction with the detailed drawings in which reference numerals refer to like elements throughout the various views.

DETAILED DESCRIPTION OF THE INVENTION

Figure 1:
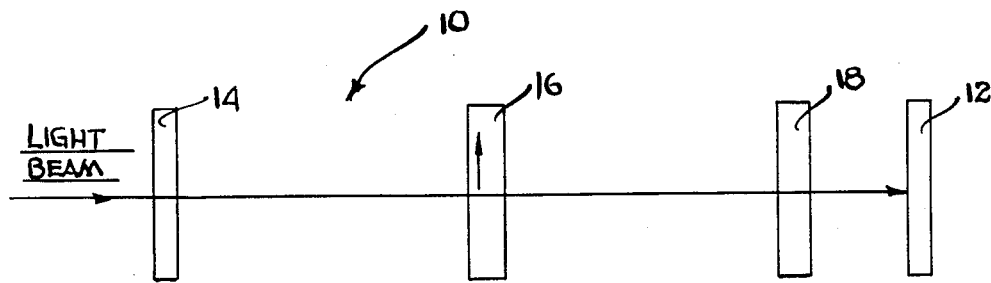
FIG. 1 is a side view of a first power limiter constructed in accordance with the invention.

Liquid crystal cells have been used as light valves for controlling the flow of infrared signals. For example, United States Application for Patent Serial No. 805635, entitled *Dual Liquid Crystal Based Visible-to-Infrared Dynamic Image Converter System*, mailed to the Patent and Trademark Office on Dec. 4, 1985, by one of the present inventors and assigned to the assignee of this invention discloses the use of a dual liquid-crystal based visible-to-infrared image detector which may make use of the usual twisted nematic arrangement of the liquid crystal or an arrangement utilizing the birefringent properties of the liquid crystal for controlling the infrared signals. In any of the arrangements disclosed, however, the liquid crystal utilizes control circuitry for determining the states of the crystal and, therefore, the passage of the infrared signals. Such an arrangement, if used as a power limiter, would require some other form of power overload detector to operate the control circuitry in order to function properly. Were such detection circuitry to operate in response to signals detected at the infrared cell, the response might in some cases be too slow to protect that cell. Consequently, some other arrangement for operating the liquid crystal light valve need be devised.

Some researchers have determined that vanadium dioxide undergoes a transition between insulator and metal when subject to different temperatures. See "Metal-insulator Transition in Vanadium Dioxide," Zylbersztejn and Mott, *Physical Review B*, Vol. 11, No. 11, June 1, 1975. In the insulator state, the material passes light while in the metal state it may be made to act as a mirror; this has allowed its use as a light valve controlled by temperature variations. See "A 10.6 Micrometer Scan Laser with Programmable VO$_2$ Mirror," Chivian, Case, and Rester, *IEEE Journal of Quantum Electronics*, Vol. QE-15, No. 12, Dec. 1979. However, such valves have proven to have low optical rejection or extinction values and are difficult to fabricate. Consequently, they have not proven useful as optical power limiters in the infrared.

Other researchers have determined that liquid crystals have some of the same properties and respond to changes in temperature in much the same manner as they respond to changes in electrical biasing potentials as well as under intense optical illumination. See "Optical Field Induced Birefringence and Freedericks Transition in a Nematic Liquid Crystal," Durbin, Arakelian, and Shen, *Physical Review Letters*, Vol. 47, No. 19, Nov. 9, 1981. For example, it has been determined that above a certain threshold of light intensity, liquid crystal molecules may be reoriented by linearly polarized light so that the directors are aligned toward the direction of the polarization axis of the incident light. It has also been determined that as a high intensity light beam passes through a liquid crystal, the heat due to optical absorption therefrom, if above a threshold level, can cause defocusing of the light passing through the liquid crystal by what is called the thermal lensing effect.

FIG. 1 illustrates an infrared detector 10 which includes a detector cell 12 positioned to receive light of infrared frequencies. This light may be continuous or pulsed. The cell 12 receives light which first passes through a linear polarizer 14, then through a liquid crystal 16, and finally through an analyzer 18. In the arrangement of FIG. 1, the liquid crystal 16 may be prepared in such a manner that the optical axis of the liquid crystal material lies parallel to the entry surface of the incident light at the left surface of the crystal 16 and also parallel to the right surface of the crystal 16 to produce, for example, a nematic liquid crystal. The liquid crystal cell 16 is oriented such that its director is at 45° with respect to the polarizer's axis. If the analyzer 18 is positioned such as to pass infrared light which has been accepted by the polarizer 14 and reoriented by the crystal 16, then that light is transferred to the detector cell 12 for detection in the normal operating condition of the detector 10.

When, however, the infrared light reaches a threshold intensity which may be capable of damaging or destroying the detector cell 12, the same intensity of the infrared light causes the directors of the liquid crystal 16 to realign so that those directors tend to lie parallel to the polarization axis of the higher power infrared beam. This optical field-induced molecular reorientation results in changes of liquid crystal birefringence and, in turn, causes polarization rotation in the outgoing beam.

The crystal 16 may also be prepared so that its optical axis lies perpendicular to the surface of the crystal 16. Similar results are produced whether the crystal 16 is a parallel, perpendicular or twisted nematic liquid crystal. In all cases the incident beam can be rejected by the analyzer 18 in the limit of high incident optical powers thus limiting the optical power applied to the detector cell 12 before it can be damaged, destroyed, or saturated.

Figure 2:
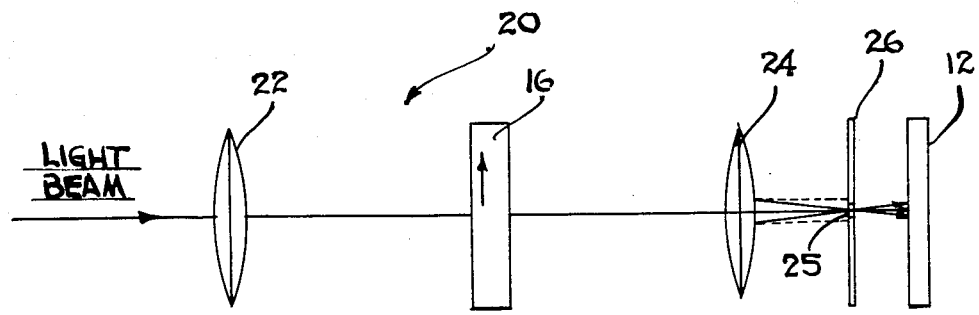
FIG. 2 is a side view of a second power limiter constructed in accordance with the invention.

FIG. 2 illustrates another infrared detector 20. The detector 20 has a detector cell 12 which receives light from a source (not shown) along a path which passes through a first lens 22, a liquid crystal 16, a second lens 24, and a pin hole in a plate 26. The liquid crystal 16 is prepared so that the directors thereof lie parallel to light passing through the liquid crystal 16; consequently, that light is not affected by the liquid crystal 16 in its normal operating state and is focused to pass through the aperture 25 of the plate 26. When the light intensity reaches a threshold level, a self-action effect in the liquid crystal 16 alters the effective focal length of the entire lens system so that a substantial portion of the light is no longer focused through the aperture 25 and the power to the detector cell 12 is limited before damage can occur. This arrangement may be used with either polarized or unpolarized light. In either case, the responsible mechanism is the thermal lensing effect due to the laser heating of liquid crystal. Moreover, in the case of polarized light the optically induced orientation mechanism also affects the limiting process.

Figure 3:
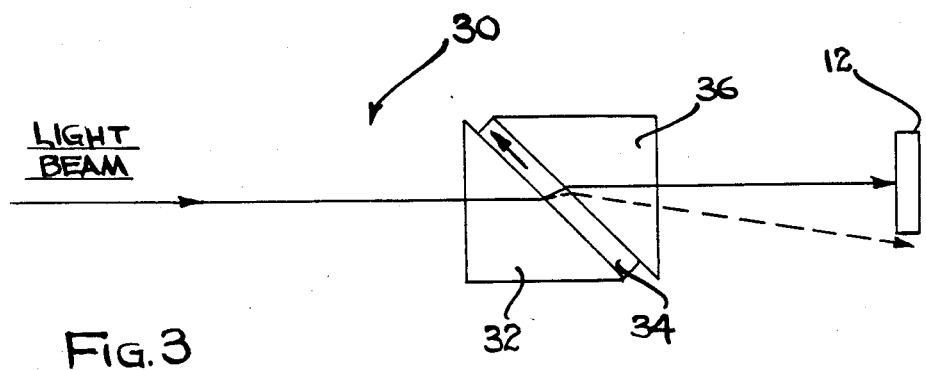
FIG. 3 is a side view of another power limiter constructed in accordance with the invention.

FIG. 3 illustrates another infrared detector 30. The detector 30 has a detector cell 12 which receives light from a source (not shown) which passes through a first prism 32, a liquid crystal 34, and a second prism 36. The liquid crystal 34 can be a parallelly aligned or a perpendicularly aligned cell so that light passes directly therethrough at a preselected angle in the normal operating condition.

The velocity of light passing through the liquid crystal 34 is, of course, dependent upon the orientation of the light because a liquid crystal has different indices of refraction parallel and perpendicular to the orientation of the optical axis of the material. When the intensity of light reaches a particular level, the indices of refraction are varied in the liquid crystal 34 so that the light is directed through the crystal 34 at the second prism 36 at a different angle, thereby diverting it from the normal light path and again limiting the power applied to the cell 12.

It has been determined that the level of intensity at which the detecting effect of a liquid crystal occurs is dependent upon the thickness of the crystal. Consequently, the threshold may be controlled by varying the thickness of the crystal in each of these arrangements.

While the invention has been described herein with reference to particular detailed embodiments, many modifications will occur to those skilled in the art which are within the spirit and scope of the invention. It is, therefore, intended that the invention be limited only by the language of the claims which are appended hereto.

What is claimed is:

1. An optical power limiter for limiting the amount of light on a detector cell, comprising:
    a first prism lying in an optical path;
    a second prism lying in said optical path following said first prism;
    a liquid crystal lying in said optical path of the light, sandwiched between said first and second prisms; and
    said liquid crystal and prisms passing the light directly therethrough at a preselected angle for light intensities below the damage threshold level of the detector cell and said liquid crystal directing the light at said second prism at a different angle for light intensities above the damage threshold level of the detector cell such that the light is directed through said second prism at a different angle and directed away from the detector cell.

* * * * *